United States Patent [19]

Hori

[11] Patent Number: 5,395,232
[45] Date of Patent: Mar. 7, 1995

[54] MOLD DEVICE IN A MOLDING MACHINE

[75] Inventor: Nobuo Hori, Kawaguchi, Japan

[73] Assignee: Kabushiki Kaisha Sanjoseiki Seisakusho, Kawaguchi, Japan

[21] Appl. No.: 867,669
[22] PCT Filed: Nov. 5, 1991
[86] PCT No.: PCT/JP91/01511
   § 371 Date: Jul. 6, 1992
   § 102(e) Date: Jul. 6, 1992
[87] PCT Pub. No.: WO92/07698
   PCT Pub. Date: May 14, 1992

[30] Foreign Application Priority Data

Nov. 5, 1990 [JP] Japan .................... 2-299603
Feb. 19, 1991 [JP] Japan .................... 3-109944

[51] Int. Cl.⁶ .................... B29C 33/26; B29C 45/66
[52] U.S. Cl. .................... 425/576; 425/409; 425/439; 425/441; 425/451.3; 425/451.5; 425/589; 425/592
[58] Field of Search ............. 425/556, 554, 592, 441, 425/442, 439, 409, 451.5, 451.3, 574, 575, 576, 589

[56] References Cited

U.S. PATENT DOCUMENTS

| 3,624,672 | 11/1971 | Spivy | 425/556 |
| 3,804,568 | 4/1974 | Rees | 425/442 |
| 3,811,809 | 5/1974 | Hitosugi | 425/173 |
| 3,830,614 | 8/1974 | Kurtz | 425/556 |
| 3,981,671 | 9/1976 | Edwards | 425/453 |
| 4,007,679 | 2/1977 | Edwards | 100/53 |
| 4,007,679 | 2/1977 | Edwards | 425/153 |
| 4,487,569 | 12/1984 | Hehl | 425/575 |
| 4,699,584 | 10/1987 | Kurita et al. | 425/450.1 |
| 4,960,374 | 10/1990 | Pröll | 425/576 |

FOREIGN PATENT DOCUMENTS

| 1219894 | 5/1960 | France . |
| 2389473 | 1/1978 | France . |
| 20 38 678 | 3/1972 | Germany . |
| 52-39765 | 3/1977 | Japan . |
| 62-1912 | 1/1987 | Japan . |
| 63-68417 | 5/1988 | Japan . |
| 3-244516 | 10/1991 | Japan . |

Primary Examiner—Jay H. Woo
Assistant Examiner—Duane S. Smith
Attorney, Agent, or Firm—Beveridge, DeGrandi, Weilacher & Young

[57] ABSTRACT

An apparatus for opening and closing a mold is described herein, wherein a movable mold is revolved and pivotally moved in association with a mold opening and closing operation. When opened, the mold is maintained in a sideways position such that the mold surface faces outwardly. In this manner, the molded article recovery operation is simplified, and monitoring of the mold surface by an industrial television set (ITV) is facilitated. In the mold opening operation, the movable mold begins at a position opposed to a fixed mold. As the mold is opened, a pinion is rotatively driven by a rack which is moved downward in association with the mold opening operation. In this manner, a rotatable block is revolved and pivotally moved along with the movable mold to a position so that the movable mold and the molded article are pointed outwardly. Ejection pins may then be used to eject the molded article off the mold.

16 Claims, 15 Drawing Sheets

MOLD DEVICE IN A MOLDING MACHINE

TECHNICAL FIELD

This invention relates to a mold device in an injection molding machine or the like for molding synthetic resin material or the like, and particularly to a mold device for revolving and pivoting a mold when the mold is opened, making use of the mold opening and closing operation.

TECHNICAL BACKGROUNDS

In the past, in the mold device in an injection molding machine or the like, when a molded article after molding is removed from the mold, a kind of industrial robot called a clamp is moved into a space of the opened mold, whereby the molded article is held by the robot which retreats from the mold space, and the molded article is recovered at a predetermined recovery location. More specifically, tile molded article is removed by a series of operations which include mold opening, entry of the clamp, holding of the molded article by the clamp, retreat of the clamp, release of the molded article from the clamp, and recovery of the molded article.

In the above-described prior art, the removal of the molded article is carried out using a kind of industrial robot called a clamp. Accordingly, a space for installation of the robot and a space for operation thereof are required. The prior art thus has problems such that the whole device becomes large-sized, and that because of the complicated and high-degree operation of the robot, the whole device also becomes complicated and high-degree accordingly, inevitably resulting in an increase in equipment cost. To solve the above-mentioned problems is thus an object of the invention.

DISCLOSURE OF THE INVENTION

According to this invention, in view of problems mentioned above caused by a restriction placed on the construction of the mold device in an injection molding machine described above with respect to the prior art, either the fixed mold or movable mold to be relatively opened and closed is revolved and pivoted through a predetermined angle by taking advantage of the mold opening and closing operation. More specifically, the aforementioned problems are solved by an arrangement wherein a revolutionary block is supported revolvably and pivotably with respect to a block supporting plate detachably mounted on a retainer plate, wherein either of the molds is mounted on the revolutionary block, and revolutionary means is provided, the means comprising an operating rod for revolving the revolutionary block by taking advantage of the mold opening and closing operation.

The arrangement of this invention is operated as follows. When, after molding, the clamping cylinder retreats and the movable mold retreats to open the mold, the revolutionary block is revolved and pivoted by the revolutionary means in response to the mold opening operation. Upon completion of mold opening, the revolutionary block is revolved through a predetermined angle, thus either the fixed mold or movable mold mounted on the revolutionary block is revolved and pivoted through a predetermined angle to tilt the mold surface outside the operating space, where the ejected molded article is disengaged from the mold and falls by gravity, and the molded article is automatically recovered into a recovery box or the like via a predetermined chute.

BRIEF DESCRIPTION OF THE DRAWINGS

All figures indicate embodiments of the invention

BEST IMPLEMENTATION OF THE INVENTION

Figure 1:
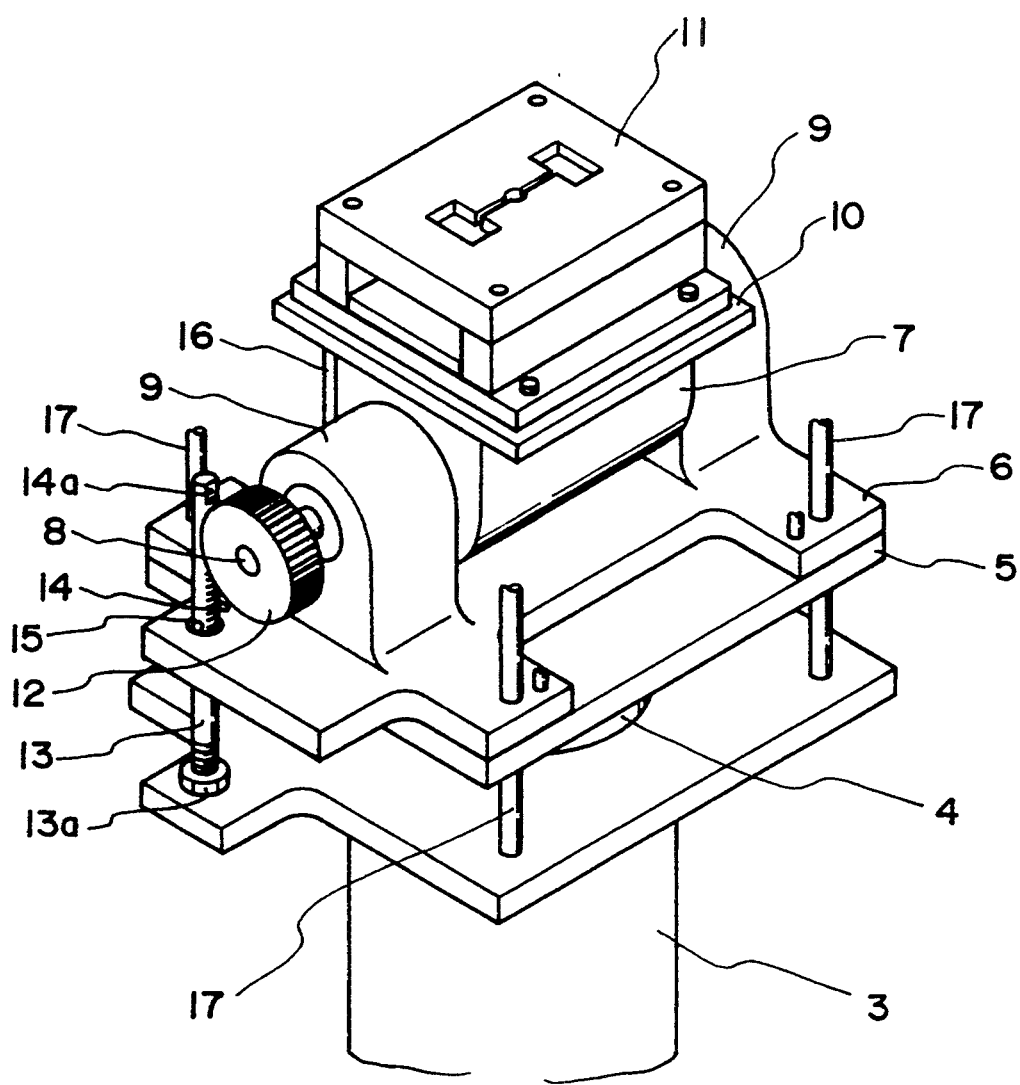
FIG. 1 is a perspective view of a first embodiment.

To disclose the best implementation of the invention, a first embodiment of this invention will be described hereinbelow with reference to FIGS. 1 to 5.

Referring to FIG. 1 and FIGS. 3 to 5, a fixed mold 2 is mounted on an upper fixed retainer plate 1 (not shown in FIG. 1), whereas a movable retainer plate 5 is provided on a clamping piston 4 of a clamping cylinder 3. A block supporting plate 6 is detachably secured onto the movable retainer plate 5, and a revolutionary block 7 is supported revolvably and pivotally about a horizontal shaft on the block supporting plate 6. That is, a horizontal rotary shaft 8 of the revolutionary block 7 is supported on the block supporting plate 6 by means of a bearing 9 whereby the revolutionary block 7 can be revolved and pivoted about the horizontal shaft. Preferably, the horizontal rotary shaft 8 is aligned with the pressure receiving center line of the clamping force.

Figure 2:
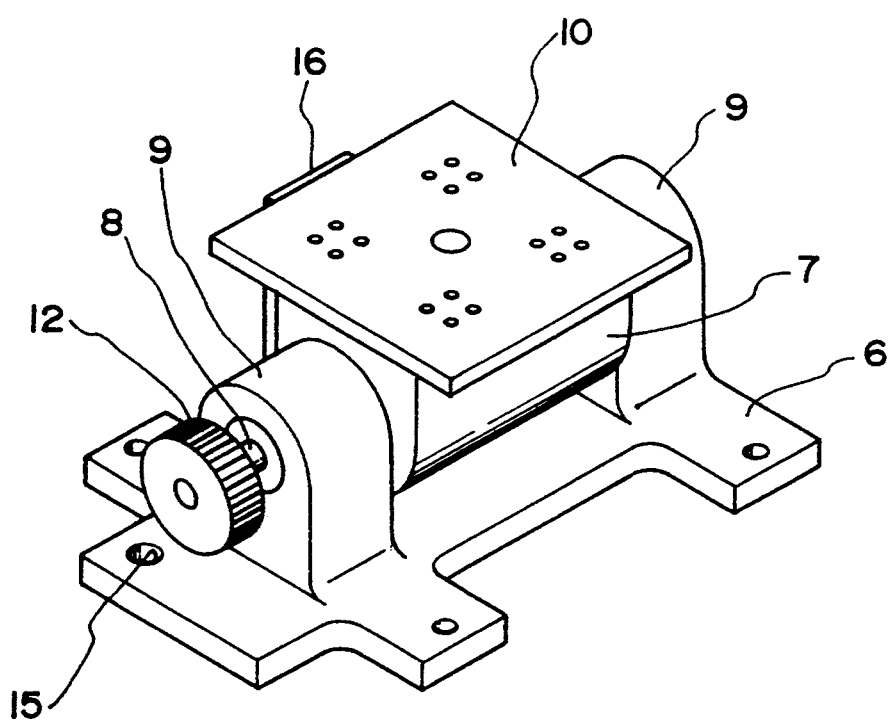
FIG. 2 is a perspective view showing essential parts of the first embodiment.

As will be apparent from FIG. 2, a mounting table 10 is fixedly mounted on the revolutionary block 7 so that a peripheral edge portion of the table 10 is projected flangewise outwardly from the upper surface of the block 7, and a movable mold 11 can be mounted detachably on the table 10 (FIG. 1 and FIGS. 3 to 5).

The block supporting plate 6, revolutionary block 7 and mounting table 10 are formed into a unit to constitute a revolutional mold supporting unit.

A pinion 12 is slipped over one end of the rotary shaft 8 of the revolutionary block 7. The pinion 12 is meshed with a rack 14 formed on a vertically extending operating rod 13 which is fixedly secured to a fixed member with respect to the ground, that is, to the clamping cylinder 3 in this embodiment. In this case, the operating rod 13 extends through a guide hole 15 bored in the block supporting plate 6 and extends upwardly from the clamping cylinder 3. The operating rod 13 is formed at its base with an external thread 13a, and two adjusting nuts 13b and 13b engaged with the external thread 13a hold a flange 3a integral with the cylinder 3 whereby the operating rod 13 is fixed adjustably in its upper and lower locations to the clamping cylinder 3. These operating rod 13, rack 14 and pinion 12 constitute revolutionary means for revolving the revolutionary block 7.

Figure 3:
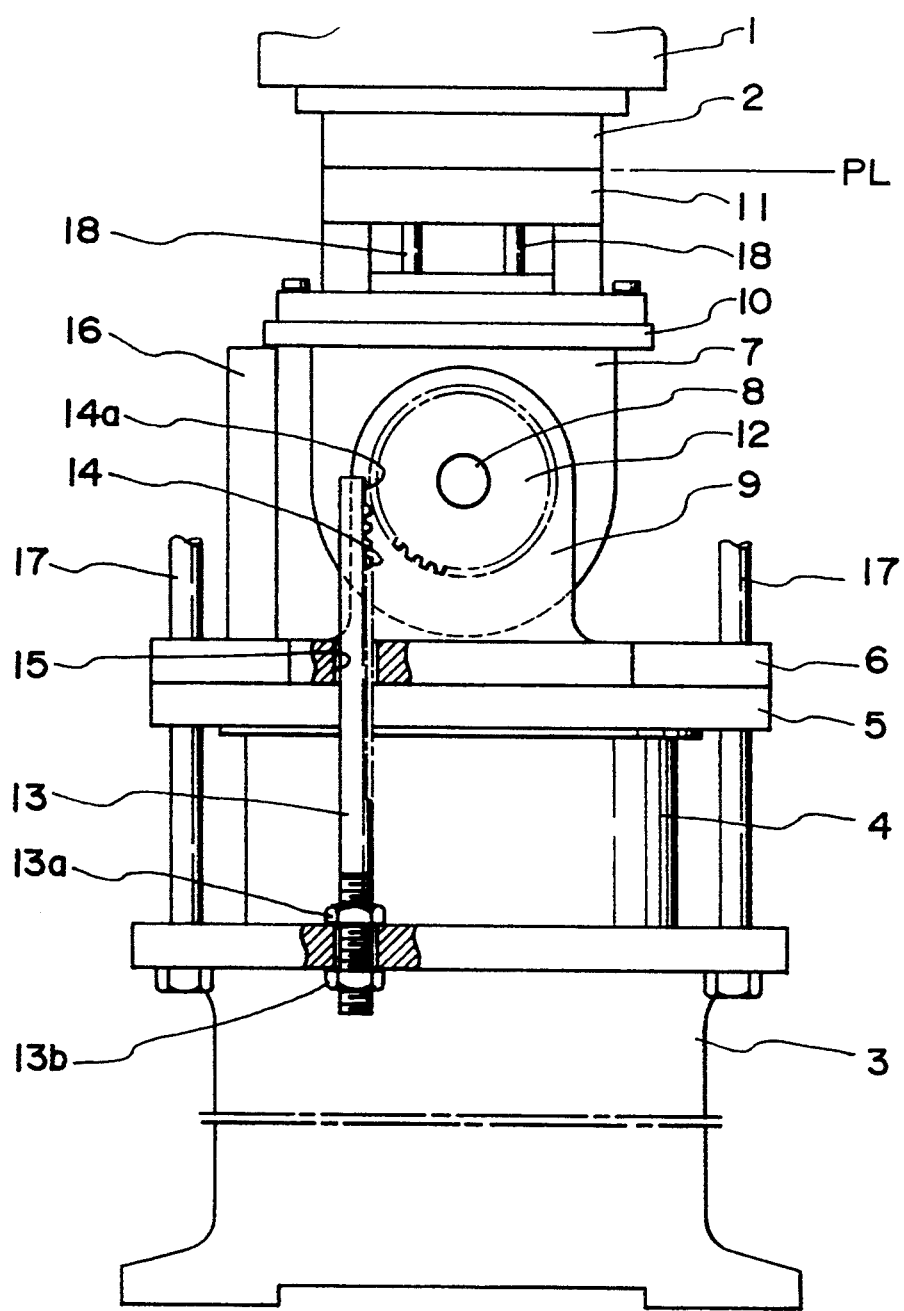
FIGS. 3 to 5 are views for explaining the operation of the first embodiment.
Figure 4:
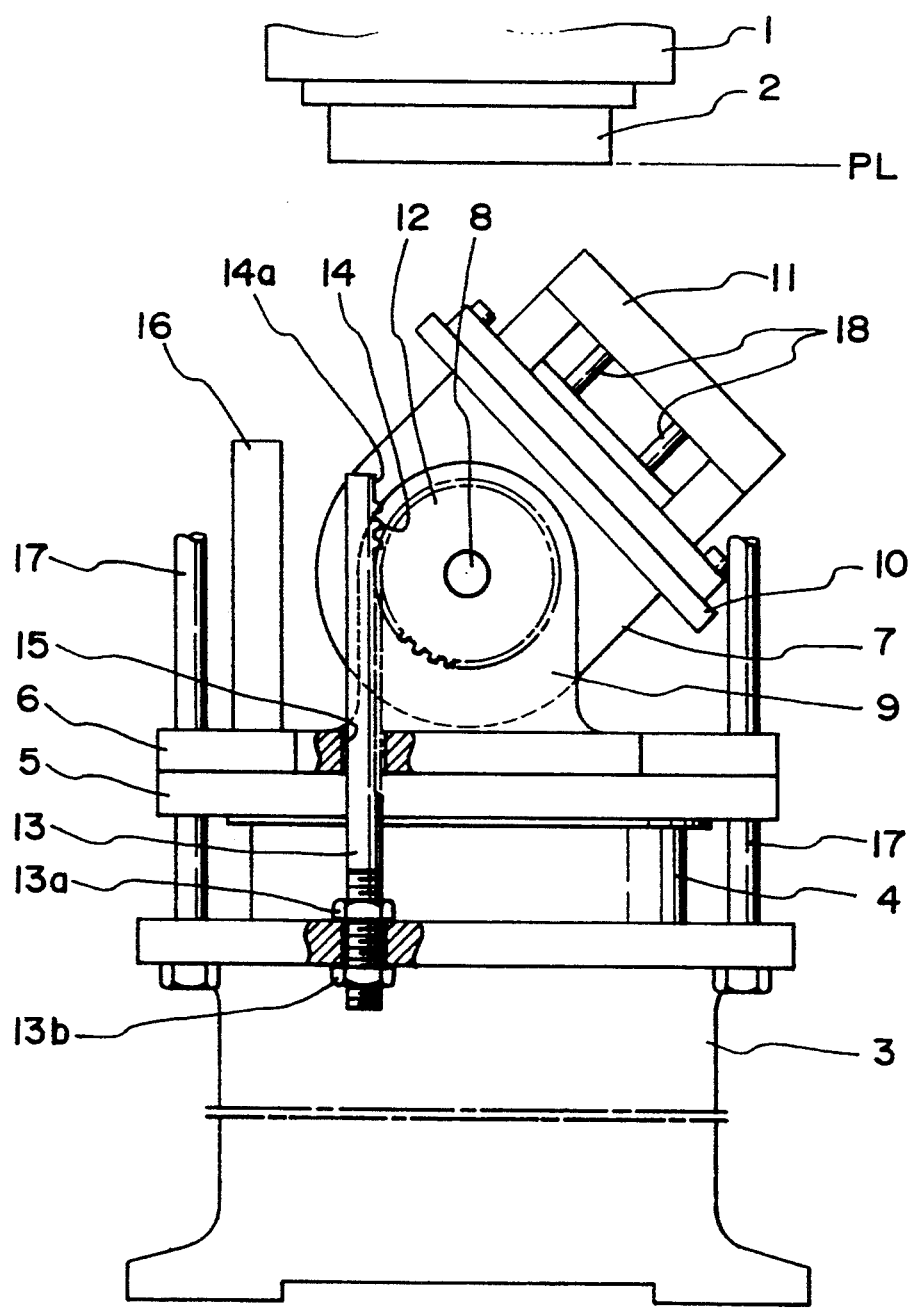
Figure 5:
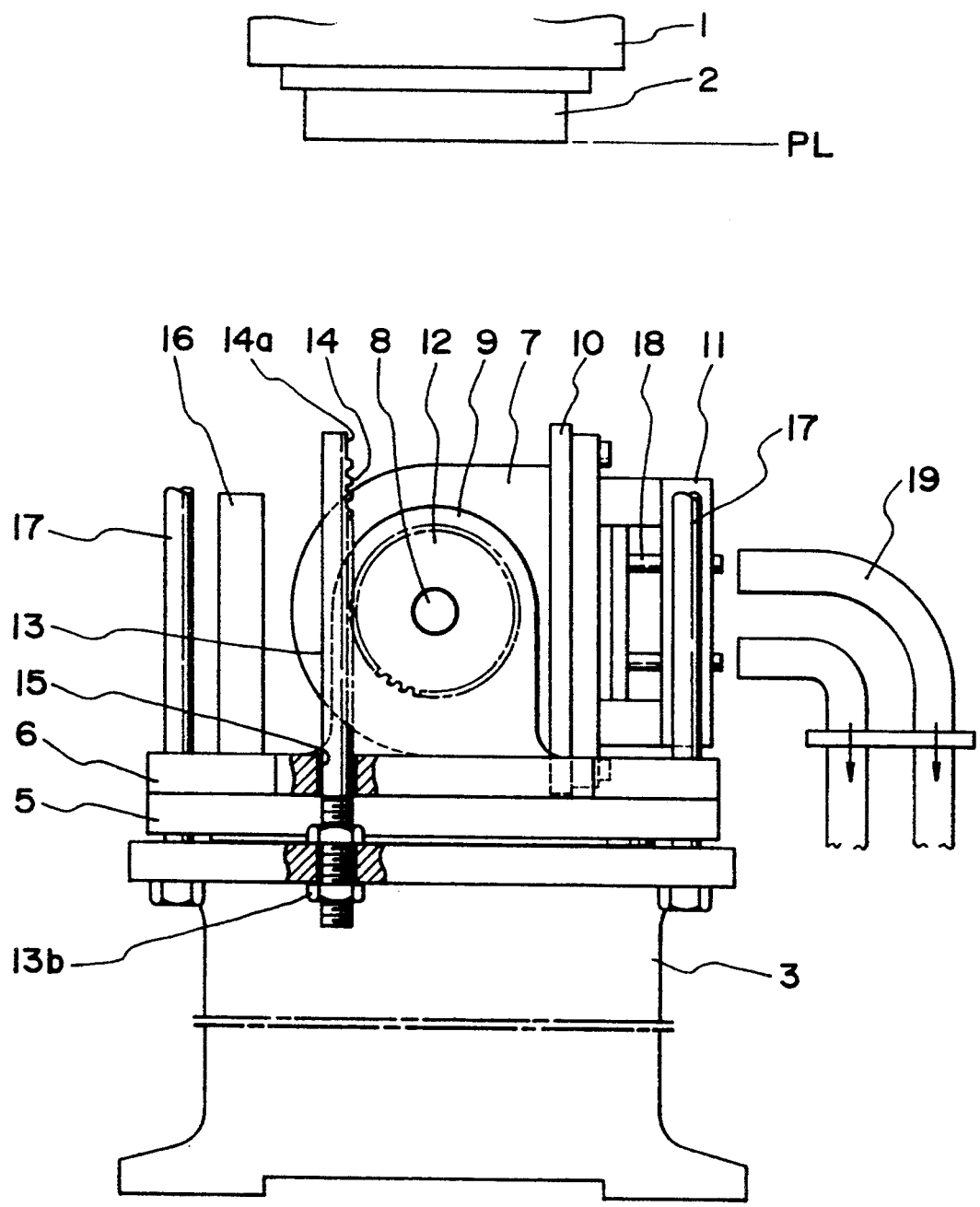

As will be apparent from FIGS. 3 to 5, a stopper 16 is protruded on the block supporting plate 6 so that when the revolutionary block 7 is revolved and pivoted and then returns to a horizontal position, the top surface of the stopper 16 comes into contact with the block 7, that is, with the lower surface of the peripheral edge portion protruded flangewise of the mounting table 10 to impede a further revolutionary and pivotal movement of tile block 7 (FIG. 3). The lower surface Of the revolutionary block 7 is semicircular as viewed in side so as to allow a free revolutionary and pivotal movement thereof. It is noted in this case that the shape of the lower surface of the revolutionary block 7 is not limited to the aforesaid semicircular shape but other shapes can be employed as long as the block 7 does not interfere with other members, particularly the block supporting plate 6 when the block 7 is revolved. The revolutionary block 7 is interiorly provided with an ejection cylinder (not shown) capable of being supplied with working oil via a flexible working oil pipe for ejecting a molded article, and an ejection pin 18 connected to a piston thereof extends through the mounting table 10, the pin 18 extending so as to be moved in and out of the bottom surface of a carved space (not shown) in the movable mold 11. A main stay indicated at 17 extends through the movable retainer plate 5 and the block supporting plate 6 and is connected to the upper fixed retainer plate 1 to support the latter.

With the above-described arrangement, at a clamping stage shown in FIG. 3, the lower surface of the flange-like peripheral edge portion of the mounting table 10 for the revolutionary block 7 comes into contact with the upper surface of the stopper 16 to impede a further rotation of the revolutionary block 7 to allow the block 7 to be in a horizontal position.

When the mold is opened from the aforesaid position of the clamping stage, the clamping piston 4 of the clamping cylinder 3 retreats and moves down, and the revolutionary block 7 also begins to move down along therewith. In the early stage, however, the pinion 12 is in contact with a plane portion 14a (a portion not formed with a rack) at the extreme end of the fixed operating rod 13, and the pinion 12 thus slides without rotation. Accordingly, the revolutionary block 7 also moves down some distance while maintaining its horizontal position without revolutionary and pivotal movement. When the clamping piston 4 further continues to move down, the pinion 12 is rotatively driven by the rack 14 of the fixed operating rod 13, and the revolutionary block 7 revolves and pivotally moves clockwise as shown in FIG. 4.

When the clamping cylinder 3 further retreats and moves down and the revolutionary block 7 further retreats and moves down, the revolutionary block 7 further revolves and pivotally moves and the movable mold 11 falls and inclines until the mold 11 substantially turns sideways as shown in FIG. 5. When, under the turned sideways state as described above, the ejection cylinder is supplied with working oil and the ejection pin 18 is protruded toward the bottom surface of the carved space in the movable mold 11, then, an ejected molded article is disengaged from the movable mold 11 and allowed to fall by gravity and recovered into a recovery box or the like via the chute 19.

If the peripheral edge portion of the mounting table 10 is placed in contact with the block supporting plate 6 at the turned sideways position of the revolutionary block 7, then, the stabilized position defining operation can be ensured. Further, by manipulating the adjusting nuts 13b and 13b, longitudinal locations of the operating rod 13 with respect to the clamping cylinder 3 can be adjusted. Moreover, the number of teeth of the pinion 12 and the amount of vertical movement of the revolutionary block 7 can be controlled to thereby define suitably the revolutionary angle of the movable mold 11, that is, the falling and inclining angle of the revolutionary block 7.

In the mold closing stage, the operation is reversed to that as described above. The revolutionary block 7 revolves and pivotally moves until the lower surface of the peripheral edge portion of the mounting table 10 of the revolutionary block 7 comes into contact with the upper surface of the stopper 16, as shown in FIG. 3. At that stage, the engagement of the pinion 12 with the rack 14 is released so that the pinion 12 faces the plane portion 14a, and therefore, the revolutionary block 7 stops to revolve and pivotally move. The block 7 moves upward while maintaining the horizontal position thereof, and accordingly, the movable mold 11 is opposed to the fixed mold 2 to complete the mold closing operation. Thereafter, the clamping operation is carried out while maintaining the horizontal position of the movable mold 11.

While in the above-described embodiment, it is designed so that the stopper 16 comes into contact with the lower surface of the flange-like peripheral edge portion of the mounting table 10, it is to be noted that the stopper 16 may come into contact with a part of the revolutionary block 7 itself. Moreover, while in the above-described embodiment the vertical operating rod 13 has been secured to the clamping cylinder 3, it is to be noted that the rod 13 may be secured to the another suitable stationary member.

Figure 6:
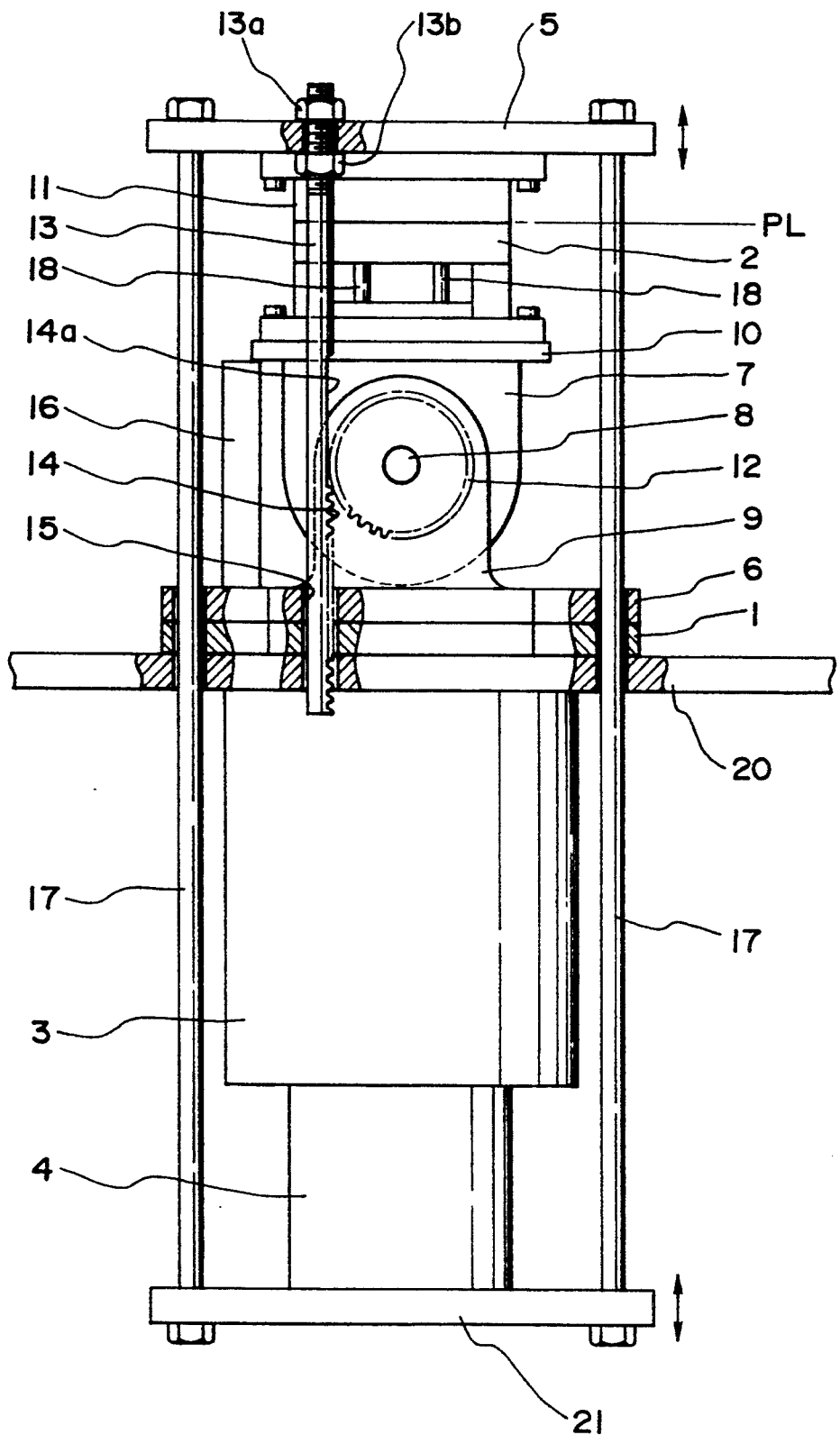
FIG. 6 is a side view, partially sectioned, of a second embodiment.

FIG. 6 shows a second embodiment in respect of the best implementation of the invention. In the above-described first embodiment, the movable mold 11 is mounted on the revolutionary block 7 and is revolved and pivotally moved through a predetermined angle together with the revolutionary block 7. In the second embodiment, however, the fixed mold 2 is mounted on the revolutionary block 7.

More specifically, the revolutionary block 7 is mounted on the fixed retainer plate 1, which is mounted on the bed 20 fixed to the ground, through the block supporting plate 6, and the fixed mold 2 is mounted on the the block 7. The movable mold 11 is mounted on the upper movable retainer plate 5, the movable mold 11 being moved up and down by a tie bar 21 and cross rods 17 for main stays secured to the piston 4 of the clamping cylinder 3 so as to be Opened and closed. In this embodiment, the operating rod 13 formed with the rack 14 has its upper end fixedly secured to the movable retainer plate 5 by means of the adjusting nuts 13a and 13b and extends downwardly, said operating rod 13 further extending downwardly through a guide hole 15 of the fixed retainer plate 1. In this case, the plane portion 14a of the operating rod 13 which is not formed with a rack is located on the root side, that is, on the upper side of the operating rod 13.

The operation of this embodiment will be described below. At the illustrated clamping stage, the pinion 12 of the revolutionary block 7 is in contact with the plane portion 14a of the operating rod 13 and is not meshed with the rack 14. When the upper movable retainer plate 5 is driven by the clamping cylinder 3 and moved upward to open the movable mold 11, the operating rod 13 also integrally moves upward. At this time, however, the rack 14 is not meshed with the pinion 12, and therefore, the revolutionary block 7 is not revolved until they are meshed with each other, and the mold is opened while maintaining the position in which the fixed mold 2 faces the movable mold 11.

Thereafter, when the rack 14 comes into engagement with the pinion 12, the revolutionary block 7 revolves as the movable mold 5 moves upward. The remainder of the operation is similar to that described in the aforementioned first embodiment.

To disclose the best implementation of the invention, another embodiment will be described hereinbelow with reference to FIGS. 7, 8 and 9.

In the first and second embodiments, the operating rod 13, which constitutes the revolutionary and pivotal means for revolving and pivotally moving the revolutionary block 7, is fixedly secured to the mounting member (the clamping cylinder 3 in the first embodiment, and the movable retainer plate 5 in the second embodiment). This embodiment, however, is different from the first and second embodiments in that the operating rod 13 is mounted on the mounting member so as to allow a movement thereof in the mold opening and closing direction by a predetermined distance.

That is, in this embodiment, a follower cylinder 22 is fixed to the clamping cylinder 3 as a mounting member, and a piston 24 formed at the extreme end of a lower end portion 23 of the operating rod 13 is slidably inserted into the follower cylinder 22. The follower cylinder 22 is provided to allow only the stroke for a predetermined distance of the operating rod 13 which moves up and down along with the piston 24, and a further downward movement thereof is interrupted by a stopper 25. In the case of this embodiment, since it is unnecessary to provide a plane portion such as the plane portion 14a of the operating rod 13 in the first and second embodiments, the rack 14 is in the stake in which it is always meshed with the pinion 12.

The operation of this embodiment will be described below. At the clamping stage shown in FIG. 7, the operating rod 13 is raised upward, and the piston 24 is also at an upper location in the cylinder 22. At this operating stage, a valve is controlled so that working oil may freely flow into and out of an upper chamber (a rod chamber) 22a and a lower chamber (a head chamber) 22b of the cylinder 22.

This operating stage is shifted to a mold opening stage. When the movable mold 11 is moved down by the clamping cylinder 3, the operating rod 13 in which the rack 14 is meshed with the pinion 12 also integrally starts its descending operation since the piston 24 can be freely moved up and down in the cylinder 22. The revolutionary block 7 is not revolved, and the movable mold 11 moves down in a position in which the former is opposed to the fixed mold 1.

Figure 8:
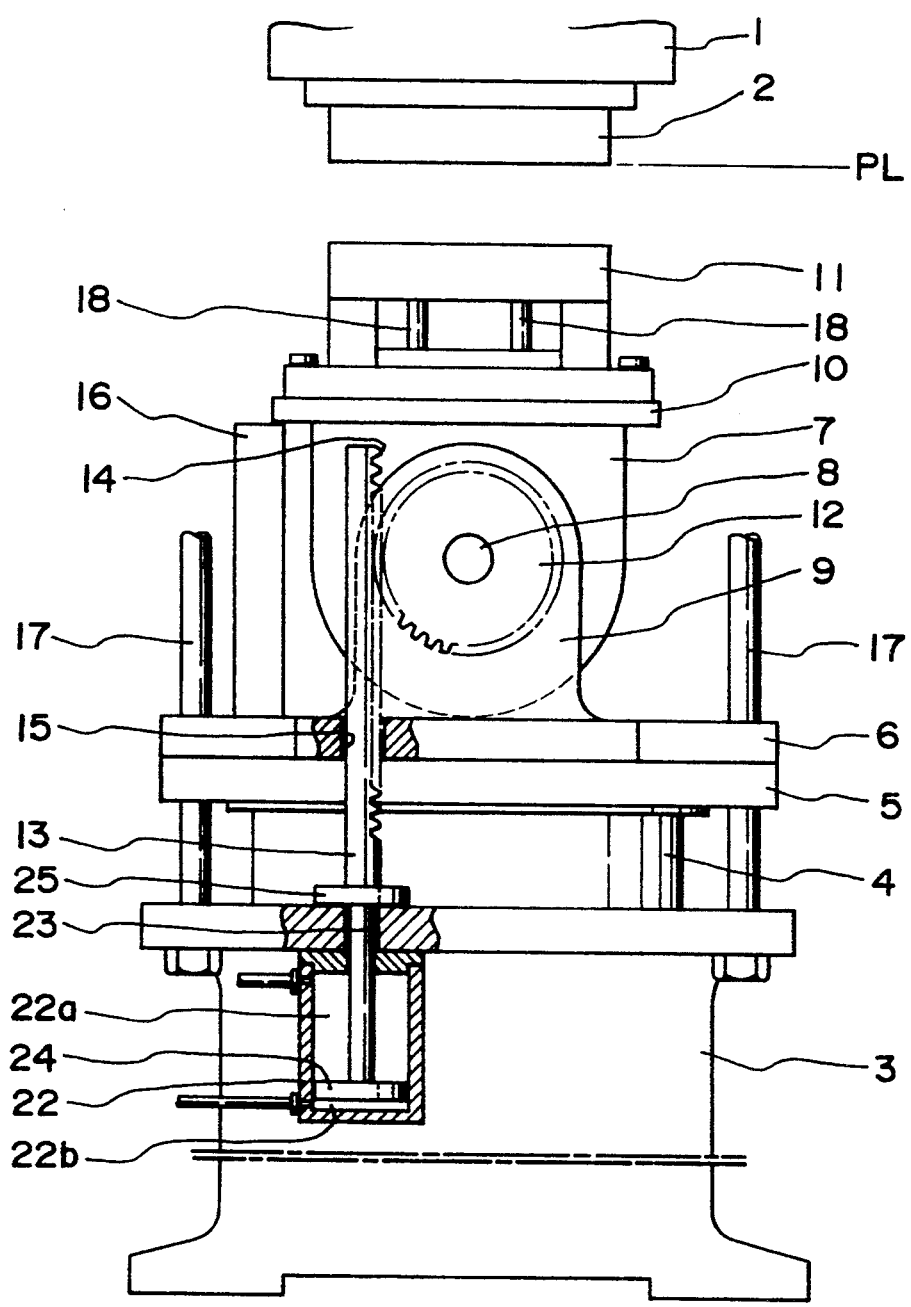

When the mold opening operation proceeds through a predetermined distance, the stopper 25 of the operating rod 13 comes into contact with the upper surface of the clamping cylinder 3 as shown in FIG. 8, and further descending of the operating rod 13 is interrupted.

After this operating stage, when the mold opening further proceeds, the revolutionary block 7 begins to be revolved and pivotally moved around the horizontal rotary shaft 8 by the action of the pinion 12 and the rack 14 of the operating rod 13. In this case, since the movable mold 11 has already been parted away from the fixed mold 2 by a predetermined distance, the operation of the mold 2 does not interfere with that of the mold 11, and the revolutionary and pivotal movement of the revolutionary block 7 continues until the movable mold 11 reaches the turned sideways position and stops thereat as shown in FIG. 9.

Next, the mold closing operation will be described. At the stage in which the revolutionary block 7 and the movable mold 11 are turned sideways as shown in FIG. 9, the follower cylinder 22 is controlled by a valve so as to impede a flow of working oil into and out of the upper chamber 22a and the lower chamber 22b, and the operating rod 13 is locked at that location. Meanwhile, the movable retainer plate 5 moves upward to initiate the mold closing operation. In this case, since the operating rod 13 is not moved upward by the locking motion of the follower cylinder 22, the revolutionary block 7 is revolved by the action of the rack 14 and the pinion 12. When the movable mold 11 returns to the horizontal position at which the mold 11 is located below the fixed mold 2 to be opposed to the same, the revolutionary block 7 is settled in its return horizontal position by the stopper 16. When, at this operating stage, the follower cylinder 22 is operated by a valve to release the locking motion of working oil and render a flow of working oil into and out of the cylinder 22 free, the operating rod 13 integrally moves upward as the movable retainer plate 5 moves upward to complete the mold closing operation of the movable mold 11 with respect to the fixed mold 2.

Figure 10:
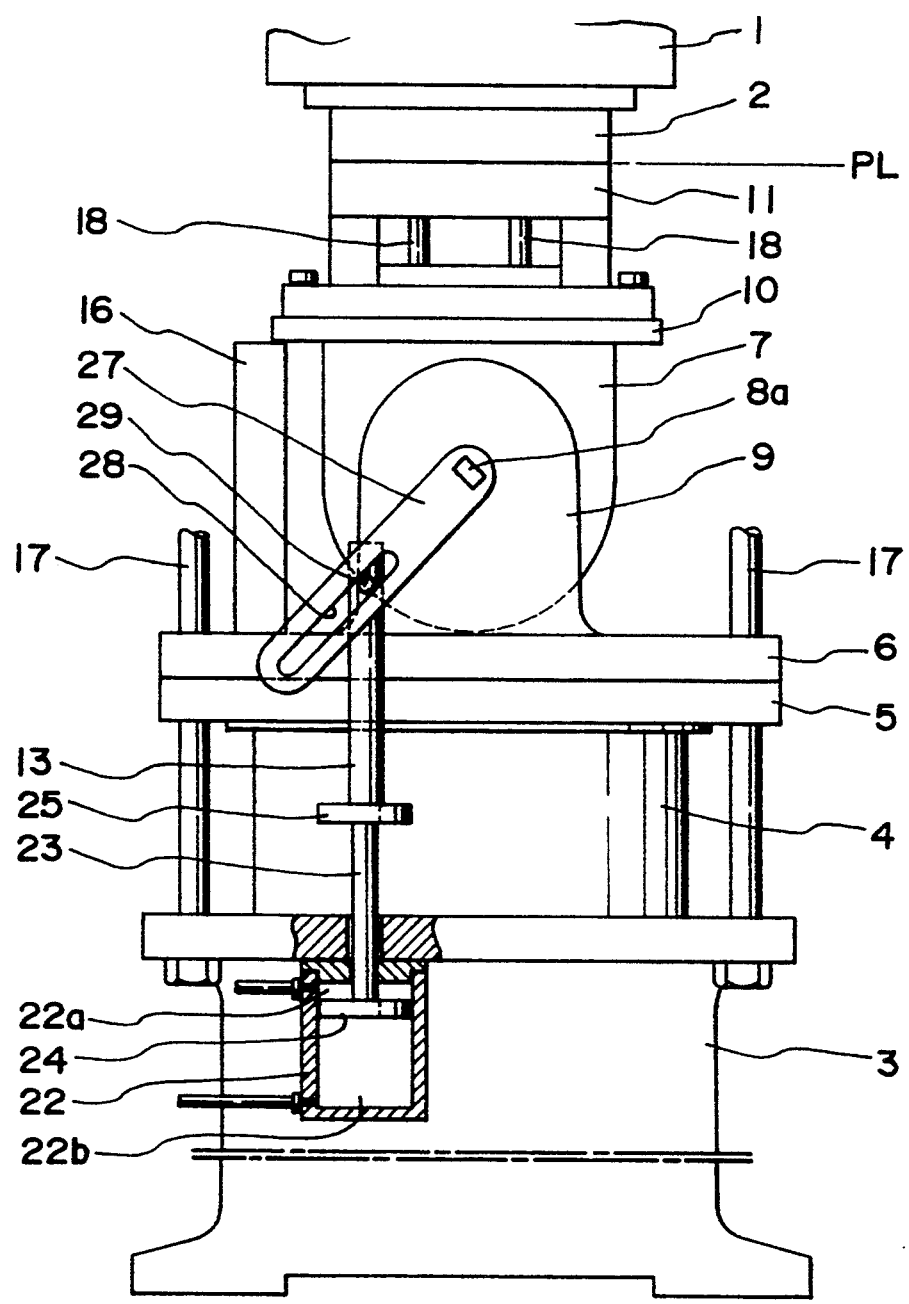
FIGS. 10 to 12 are views for explaining the operation of a fourth embodiment.
Figure 11:
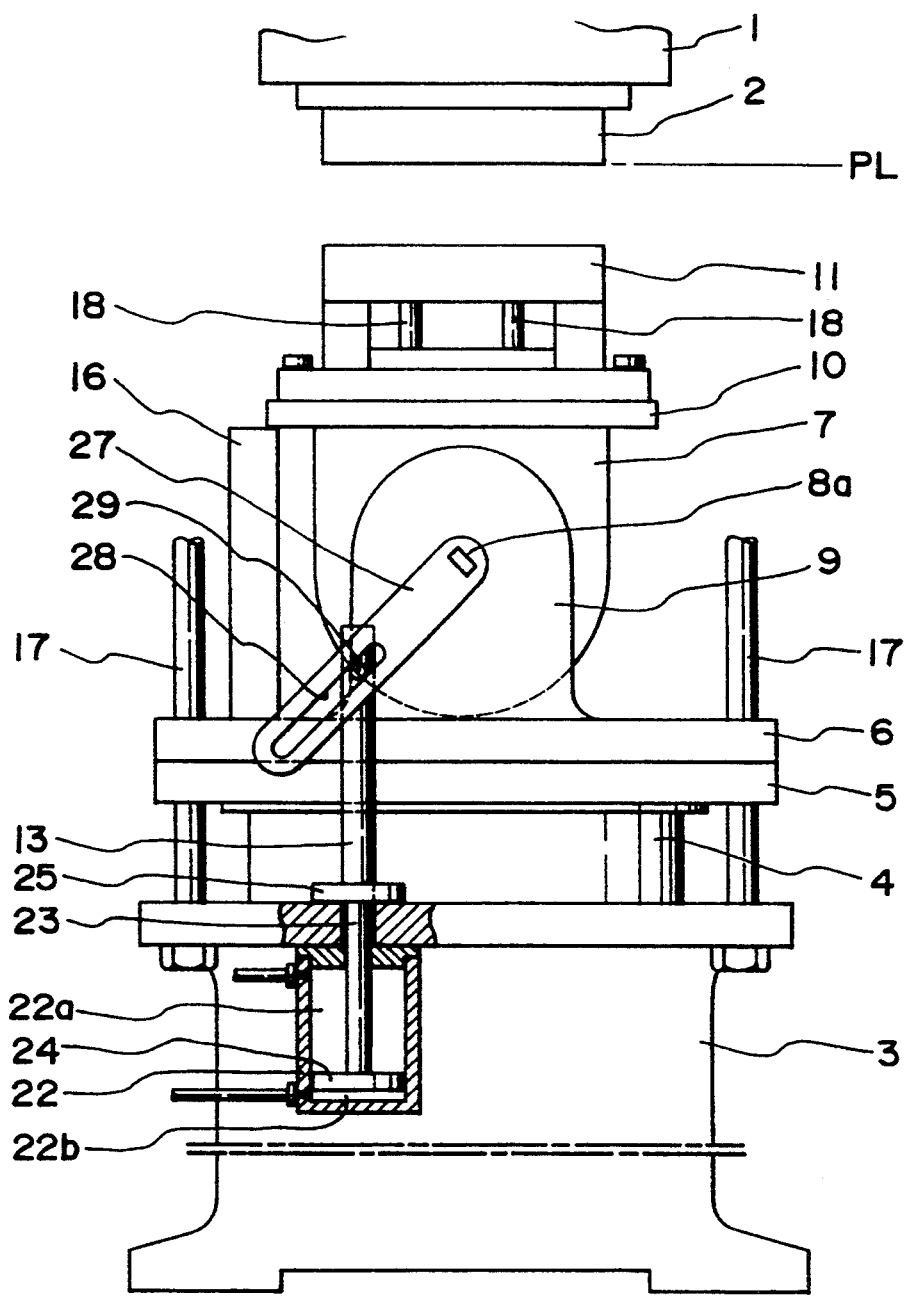
Figure 12:
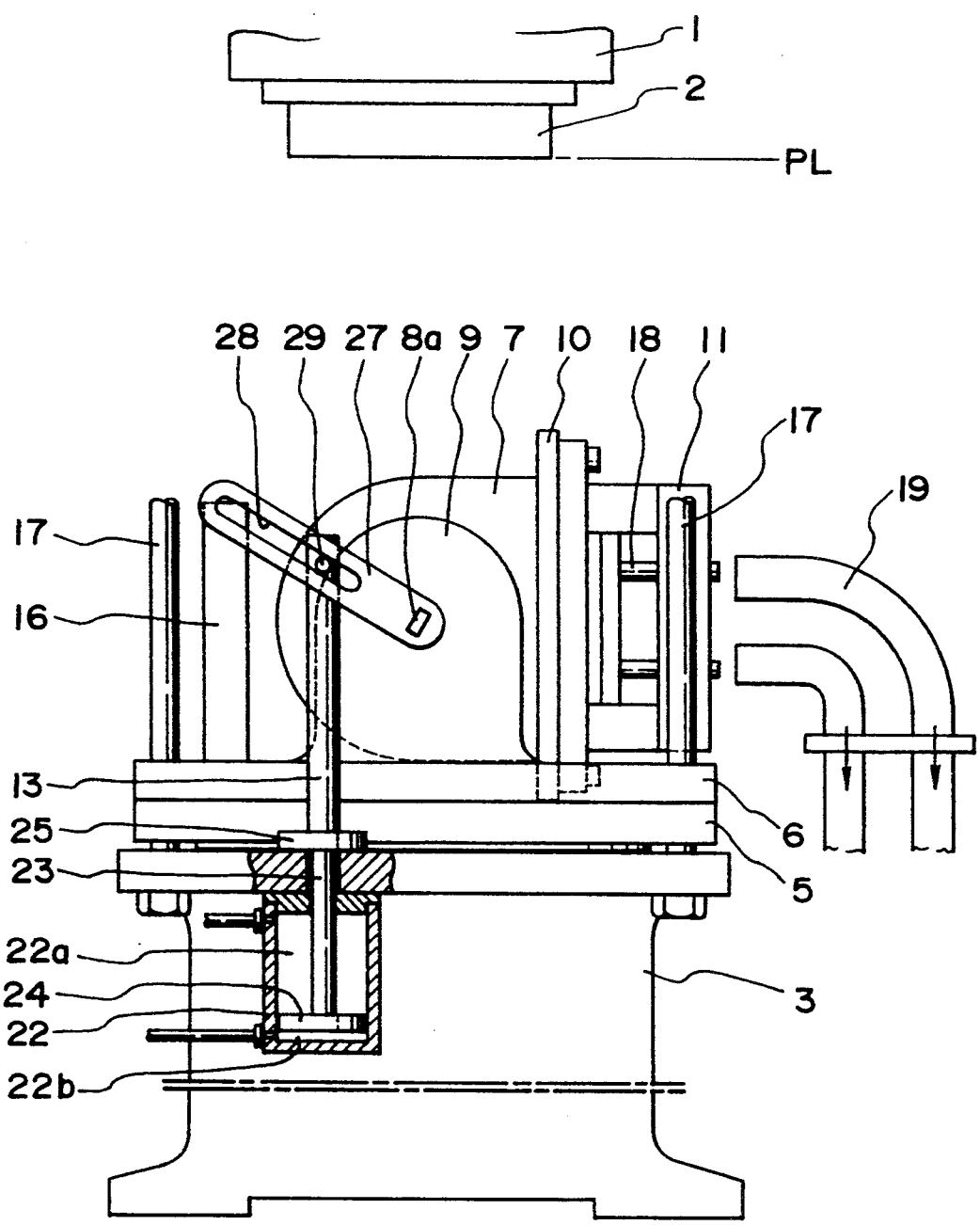

To disclose the best implementation of the invention, still another embodiment (a fourth embodiment) is shown in FIGS. 10, 11 and 12, in which the revolutionary and pivotal means for revolving and pivotally moving the revolutionary block 7 is different from that shown in the aforementioned first to third embodiments.

In these figures, a revolutionary arm 27 is secured to the revolutionary block 7, the arm 27 being formed with a slot 28 bored therein, and a pin 29 protruded on the operating rod 13 is slidably inserted into the slot 28. The revolutionary arm 27 is coupled relatively unrotatably with the rotary shaft 8 by means of a mechanism in which the arm 27 is brought into engagement with a prismatic portion 8a formed at an end of the rotary shaft 8 of the revolutionary block 7. Also, in this embodiment, the follower cylinder 22 is provided at the end of the operating rod 13 in the same way as the third embodiment shown in FIGS. 7 to 9. However, since the valve control during the mold opening and closing operation is similar to the case of the third embodiment, the explanation thereof is omitted.

When the mold opening operation starts from the closed state shown in FIG. 10, the operating rod 13 moves down along with the revolutionary block 7, and the revolutionary block 7 is not revolved but the movable mold 11 moves down in the horizontal position while being opposed to the fixed mold 2 as shown in FIG. 11.

When the operation rod 13 moves to a location as shown in FIG. 11, a further downward movement thereof is interrupted by the stopper 25. As the movable retainer plate 5 and the revolutionary block 7 further move down, the pin 29 is slidably moved along the slot 28 to cause the revolutionary arm 27 to be rotated. Therefore, as shown in FIG. 12, the revolutionary block 7 revolves and pivotally moves, and the movable mold 11 reaches the turned sideways position so that the mold surface faces outside the operating space.

Figure 7:
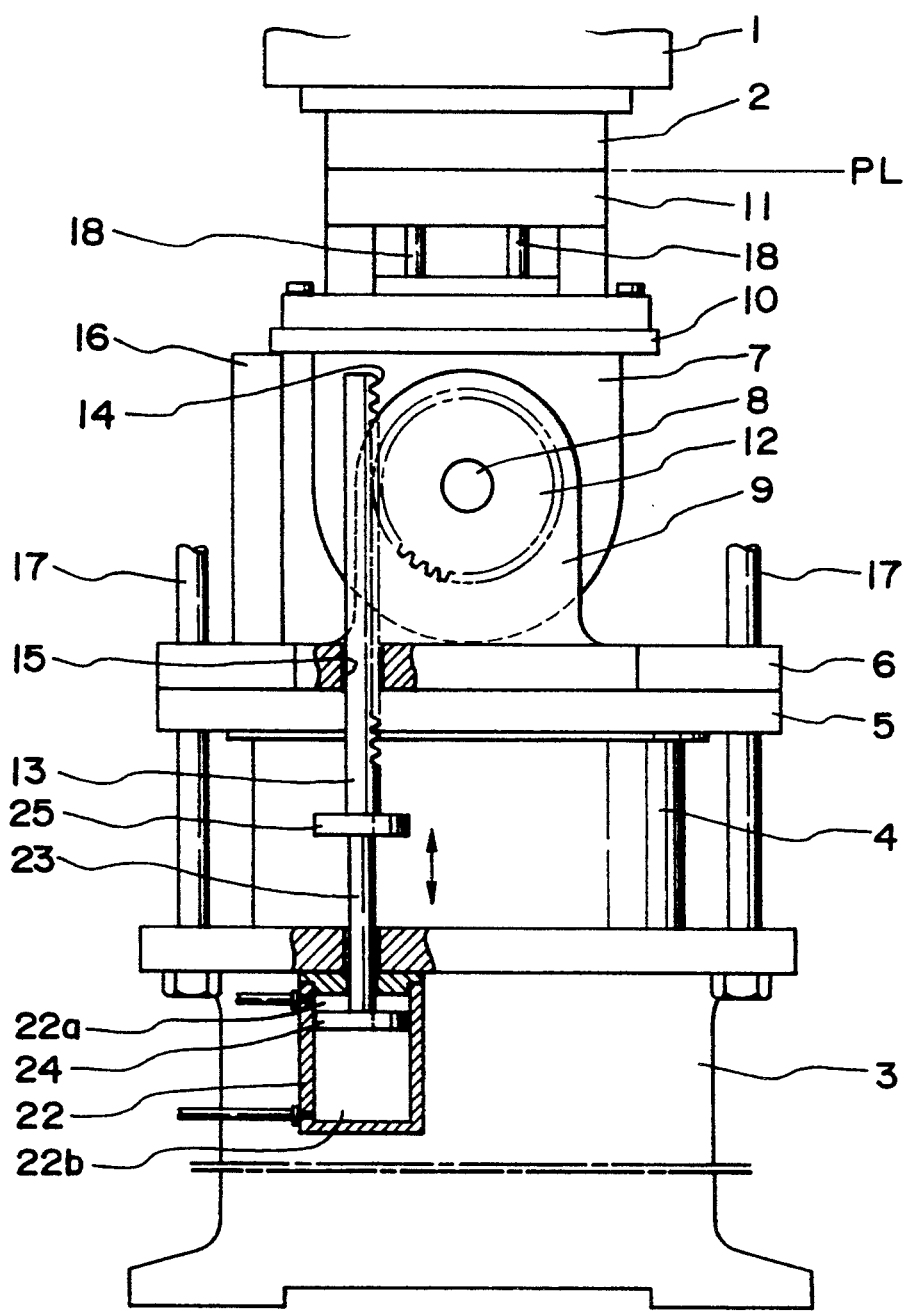
FIGS. 7 to 9 are views for explaining the operation of a third embodiment.
Figure 9:
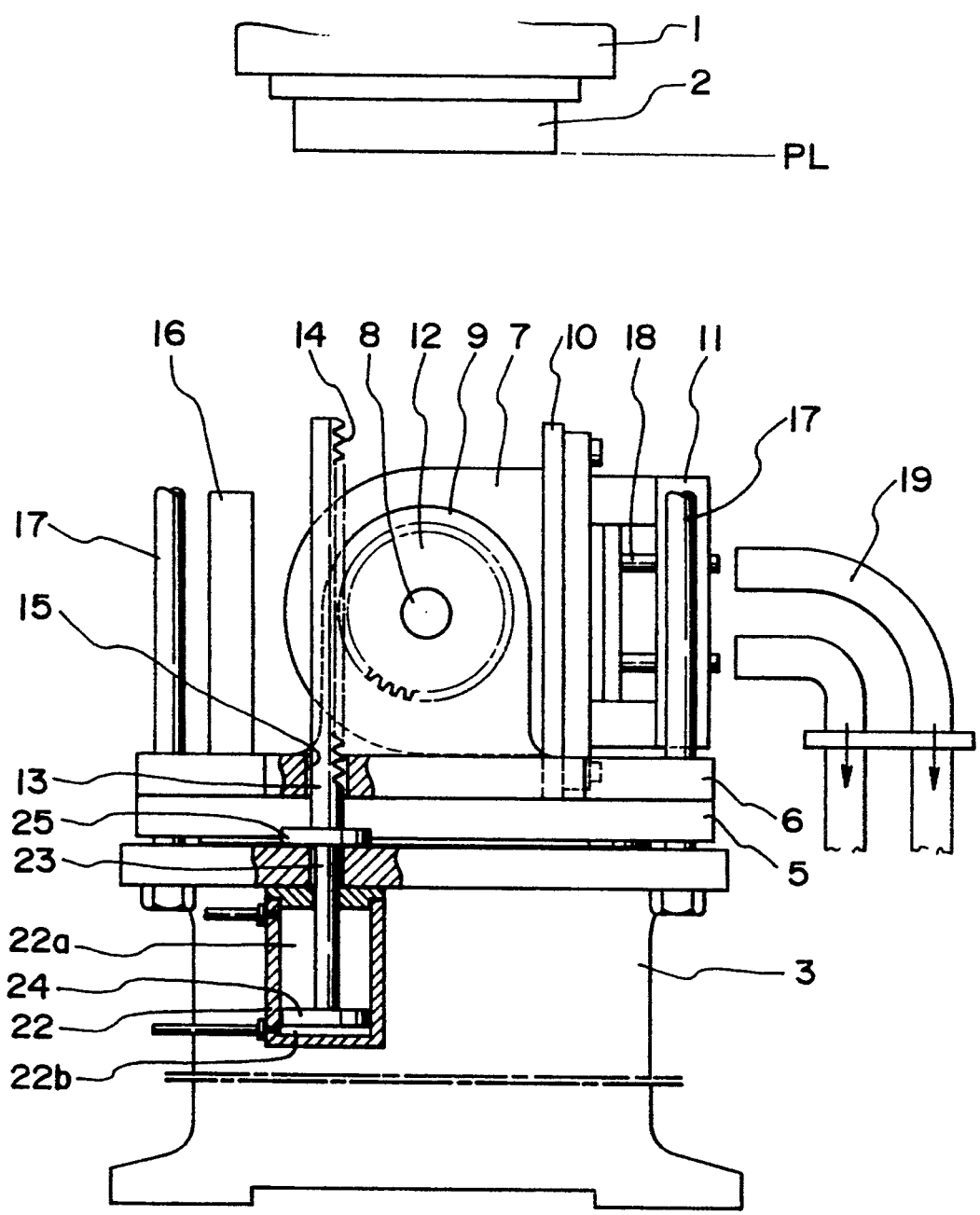

The valve control of the follower cylinder 22 during the mold closing operation is also similar to the case of the third embodiment shown in FIGS. 7 to 9. It will be easily understood that at the early stage of the mold closing operation, the revolutionary block 7 is revolved and pivotally moved, and after the movable mold 11 has been opposed to the fixed mold 2, the operating rod 13 also moves upward along with the revolutionary block 7 to complete the mold closing operation.

Figure 13:
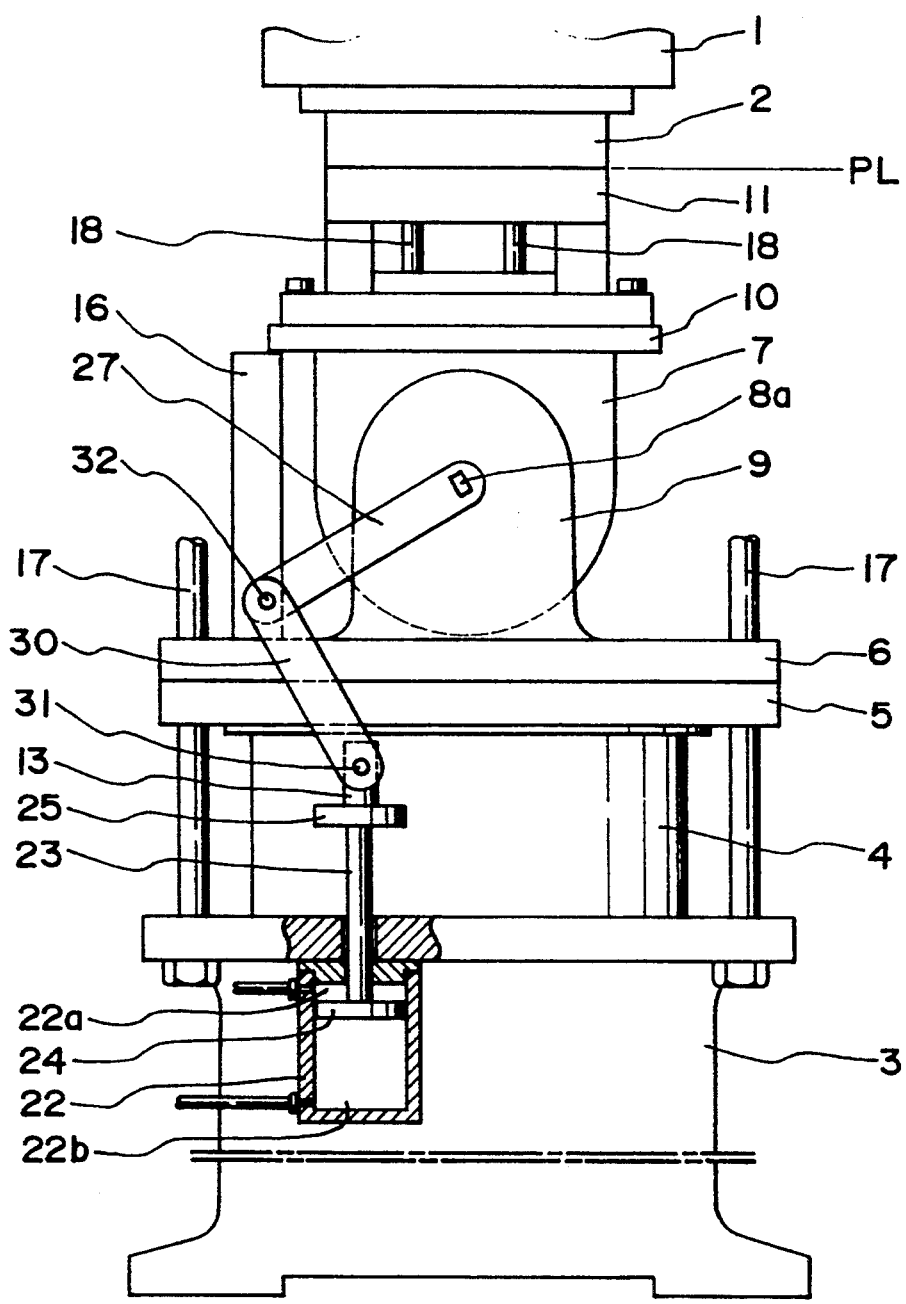
FIGS. 13 and 14 are views for explaining the operation of a fifth embodiment.
Figure 14:
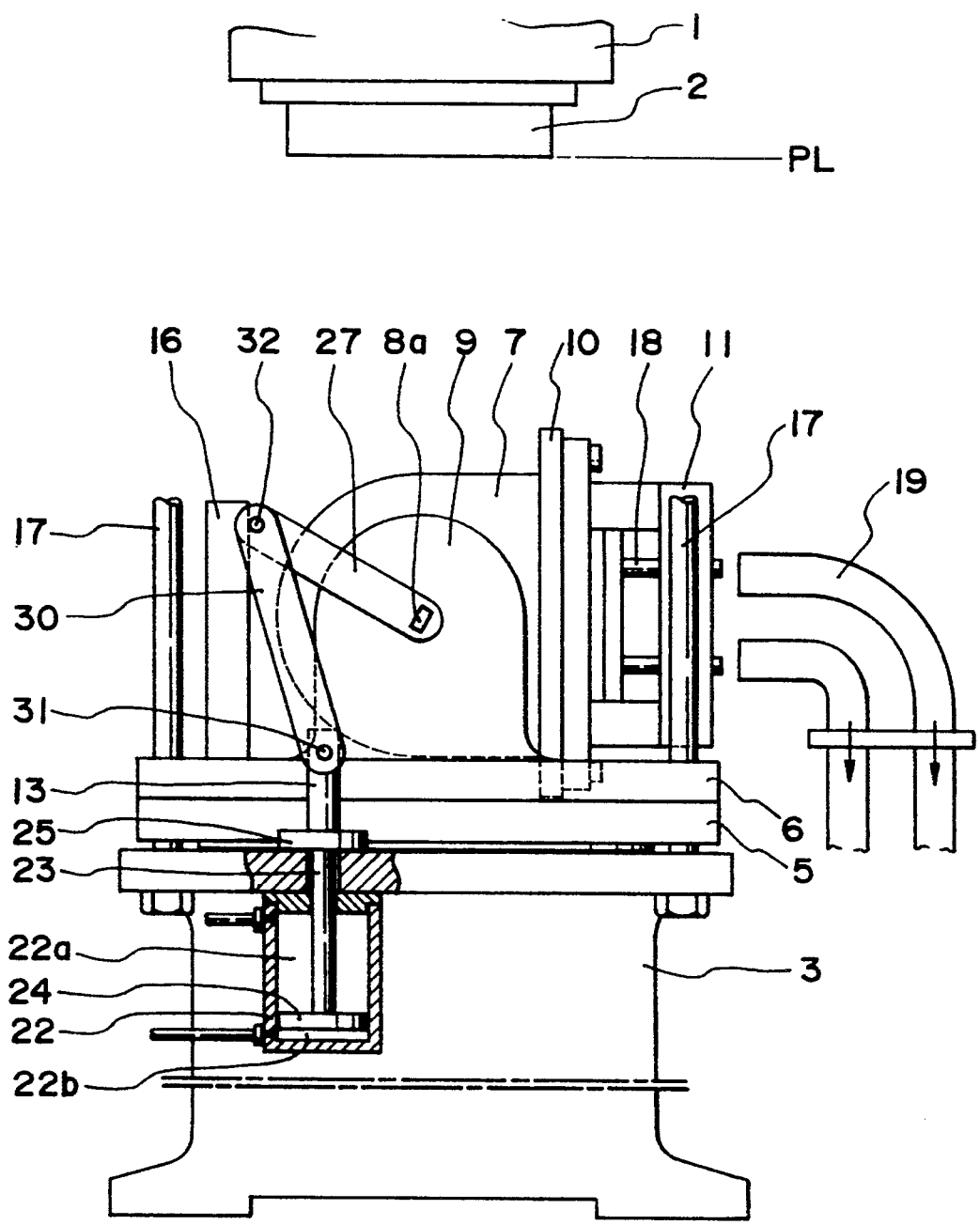

A fifth embodiment in respect of the best implementation of the invention is shown in FIG. 13 and 14. This embodiment is different from the fourth embodiment shown in FIGS. 10 to 12 in that a linking rod is used as connection means between the revolutionary arm 27 and the operating rod 13.

In the figures, the revolutionary arm 27 of the revolutionary block 7 and the operating rod 13 are connected by means of a linking rod 30. More specifically, the linking rod 30 is pivotally mounted on the operating rod 13 by means of the pin 31, and the linking rod 30 is also pivotally mounted on the revolutionary arm 27 by means of a pin 32. The revolutionary arm 27 and the linking rod 30 constitute a link mechanism.

In the early stage of the mold closing operation, the operating rod 13 moves down along with the revolutionary block 7, and therefore, a positional relationship between the revolutionary arm 27 and tile linking rod 30 linked thereto remains unchanged. When a downward movement of the operating rod 13 is soon interrupted by the stopper 25, the revolutionary arm 27 is rotatively driven clockwise by the linking rod 30 so that as shown in FIG. 14, the revolutionary block 7 revolves and pivotally moves, and the movable mold 11 thus reaches the turned sideways position.

The movement of the follower cylinder 22 during the mold closing operation is also totally similar to the cases of the third and fourth embodiments already described.

Figure 15:
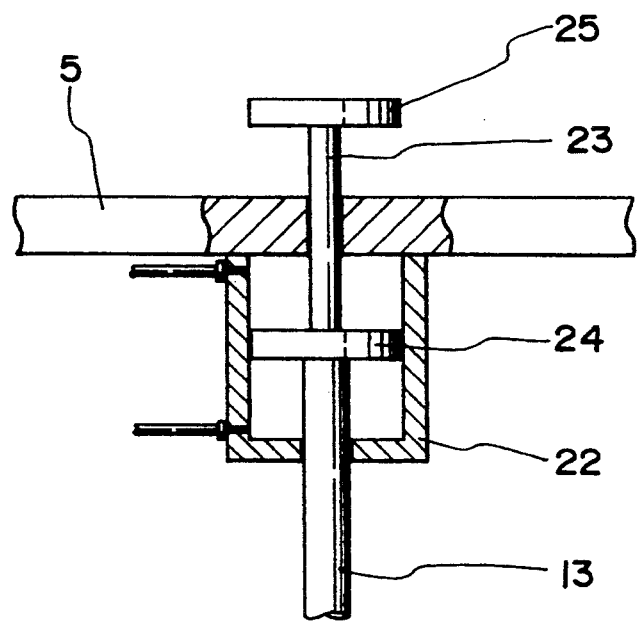
FIG. 15 is a partial view of another embodiment.

In the third, fourth and fifth embodiments described in connection with FIGS. 7 to 9, FIGS. 10 to 12 and FIGS. 13 and 14 respectively, the lower movable mold 11 is revolved and pivotally moved while being opened and closed with respect to the upper fixed mold 2. It is, however, to be noted of course that in the same way as the second embodiment shown in FIG. 6, the lower fixed mold 2 may be revolved and pivotally moved by the mold opening and closing operation of the upper movable mold 11. It is natural in this case that as shown in FIG. 15, the follower cylinder 22 is mounted on the upper retainer plate 5, and the stopper 25 is allowed to be provided on the opposite side of the cylinder 22 over the upper movable retainer plate 5.

Furthermore, although in any of these embodiments described above, a description has been made of a vertical type molding machine, it is obvious that the present invention can be applied to a lateral type molding machine. As for the revolutionary direction of the revolutionary block in the lateral type molding machine, there can be employed a mode for implementation in which the block is revolved about a vertical shaft in a horizontal surface to direct the mold surface toward an operator, and a mode for implementation in which the block is revolved about a horizontal shaft in a vertical surface to direct the mold surface downwardly. In the case of the latter mode in which the mold surface is directed downwardly, scavenging undesirable inserts in a carved space in the mold by means of gravity and swishing waste liquid off the carved space in the mold can be accomplished, thus resulting in an incidental advantage that the mold surface is easily cleaned.

INDUSTRIAL USABILITY

As described above, according to the present invention, a revolutionary block is revolvably and pivotally supported on a block supporting plate mounted on a retainer plate, either a fixed mold or a movable mold is mounted on the revolutionary block, and an operating rod is provided to revolve the revolutionary block in respose to the opening and closing operation of the movable mold. With this arrangement, in the mold opening operation after molding, one mold is revolved and pivotally moved to cause the mold surface to face outside the operating space, where a molded article ejected and disengaged from the mold falls by gravity. Accordingly, an industrial robot for removing a molded article is not required so that the whole apparatus is prevented from being large-sized. In addition, since the mold opening and closing operation itself is utilized to pivotally move the revolutionary block, a separate driving means is not additionally required, this, therefore, ensuring industrial usability in that the structure of the apparatus is extremely simple and the cost is considerably reduced.

Moreover, the revolutionary and pivotal movement of the revolutionary block appears just during a period of mold opening operation, this, therefore, ensuring industrial usability in that a period of removing molded articles overlaps with the period of mold opening operation, and as a result, the overall operating period is shortened.

Furthermore, since the mold surface faces outside the operating space by means of the revolutionary and pivotal movement of the revolutionary block, automatic monitoring of the carved space in the mold by an industrial television set (ITV), which is difficult to be installed in the operating space, becomes very easy by the installation of the ITV out of the operating space and in addition, inserting inserts into the carved space in the mold is also easily attained.

Particularly in the case the present device is applied to the vertical type molding machine, the mold in an open state can be inclined at a suitable angle of inclination sideways to ensure a position facing to an operator, in which case, an insert inserting operation is particularly advantageous.

By the additional installation of a follower cylinder on an operating rod, the operating rod can be moved by a predetermined distance during the mold opening and closing operation, and therefore, at the early stage Of mold opening operation, the operating rod is moved in assoiation with the opening operation of the movable mold, and the revolutionary block is thus not revolved. Accordingly, the movable mold and the fixed mold are maintained at the position opposed to each other until they are parted by a considerably large predetermined distance, and thereafter, the revolutionary block begins to revolve and pivot. Therefore, both of the molds are not interfered or run against each other during the revolutionary and pivotal movement. In the mold closing operation, closure is attained after both of the molds have been accurately opposed to each other, and thereafter, clamping is effected. Therefore, an unnatural force is not applied to the molds.

Futheremore, since the revolutionary mold support unit is of a complete separate unit, it is not only applicable to various mold devices but also the revolutionary direction of the mold can be freely selected.

In addition, by the protrusion of a stopper in contact with the revolutionary block, the movable mold can be accurately opposed to the fixed mold at the termination stage of mold closing operation. Therefore, there is a further advantage in that the revolutionary block itself effectively functions as a member for stably transmitting a high clamping pressure to the fixed mold at the succeeding clamping stage.

I claim:

1. A mold device, comprising:
   a fixed mold mounted on a fixed retainer plate;
   a movable mold mounted on a movable retainer plate, wherein said movable retainer plate is moved by a clamping cylinder, said movable mold being movable with respect to said fixed mold;
   a revolutionary block including a rotary shaft, wherein said movable mold is mounted on said revolutionary block, and said revolutionary block is supported revolvably and pivotally with respect to a block supporting plate, said block supporting plate being detachably secured onto said movable retainer plate; and
   revolutionary and pivotal means for causing said revolutionary block to be revolved and pivoted during an opening and closing operation of said movable mold, said revolutionary and pivotal means including:
   (a) an operating rod including a root side portion received by a fixed member with respect to ground,
   (b) a plane portion formed on an extreme end of a head portion of said operating rod,
   (c) a rack formed on a portion of said operating rod adjacent said plane portion, and
   (d) a pinion on one end of said rotary shaft of said revolutionary block adapted to mesh with said rack and contact said plane portion.

2. The mold device according to claim 1, wherein said operating rod of said revolutionary and pivotal means is slidably supported in a mold opening and closing direction.

3. The mold device according to claim 2, wherein a follower cylinder is fixedly secured to a fixed member with respect to ground, and a piston is slidably inserted into said follower cylinder to allow movement of said rod in the mold opening and closing direction.

4. The mold device according to claim 3, wherein said piston is formed on an extreme end of said root side portion of said operating rod.

5. A mold device, comprising:
   a fixed mold mounted on a retainer plate;
   a movable mold mounted on a movable retainer plate, wherein said movable retainer plate is moved by a clamping cylinder, said movable mold being movable with respect to said fixed mold;
   a revolutionary block including a rotary shaft, wherein said fixed mold is mounted on said revolutionary block, and said revolutionary block is supported revolvably and pivotally with respect to a block supporting plate, said block supporting plate being detachably secured onto said retainer plate for said fixed mold; and
   revolutionary and pivotal means for causing said revolutionary block to be revolved and pivoted during an opening and closing operation of said movable mold, said revolutionary and pivotal means including:
   (a) an operating rod including a root side portion received by said movable retainer plate,
   (b) a rack formed on a head portion of said operating rod,
   (c) a plane portion formed on a portion of said operating rod adjacent said head portion, and
   (d) a pinion on one end of said rotary shaft of said revolutionary block adapted to mesh with said rack and contact said plane portion.

6. The mold device according to claim 5, wherein said operating rod of said revolutionary and pivotal means is slidably supported in a mold opening and closing direction.

7. The mold device according to claim 6, wherein a follower cylinder is fixedly secured to a fixed member with respect to said movable retainer plate, and a piston is slidably inserted into said follower cylinder to allow movement of said rod in the mold opening and closing direction.

8. The mold device according to claim 7, wherein said piston is formed on an extreme end of said root side portion of said operating rod.

9. A mold device, comprising:
   a fixed mold mounted on a fixed retainer plate;
   a movable mold mounted on a movable retainer plate, wherein said movable retainer plate is moved by a clamping cylinder, said movable mold being movable with respect to said fixed mold;
   a revolutionary block including a rotary shaft, wherein said movable mold is mounted on said revolutionary block, and said revolutionary block is supported revolvably and pivotally with respect to a block supporting plate, said block supporting plate being detachably secured onto said movable retainer plate; and
   revolutionary and pivotal means for causing said revolutionary block to be revolved and pivoted during an opening and closing operation of said movable mold, said revolutionary and pivotal means including:
   (a) an operating rod including a root side portion received by a fixed member with respect to ground,
   (b) a follower cylinder fixedly secured to a fixed member with respect to ground,
   (c) a piston formed on the operating rod and slidably inserted into said follower cylinder to allow movement of said operating rod, and
   (d) a revolutionary arm connected between said operating rod and said revolutionary block.

10. The mold device according to claim 9, wherein said operating rod is slidably supported in a mold opening and closing direction.

11. The mold device according to claim wherein said piston is formed on an extreme end of said root side portion of said operating rod and allows movement of said rod in the mold opening and closing direction.

12. The mold device according to claim 10, wherein said revolutionary arm is linked with said operating rod so as to allow movement of said rod in the mold opening and closing direction and to maintain a horizontal position of the revolutionary block when said movable mold is opposite said fixed mold.

13. A mold device, comprising:
   a fixed mold mounted on a retainer plate;
   a movable mold mounted on a movable retainer plate, wherein said movable retainer plate is moved by a clamping cylinder, said movable mold being movable with respect to said fixed mold;

a revolutionary block including a rotary shaft, wherein said fixed mold is mounted on said revolutionary block, and said revolutionary block is supported revolvably and pivotally with respect to a block supporting plate, said block supporting plate being detachably secured onto said retainer plate for said fixed mold; and revolutionary and pivotal means for causing said revolutionary block to be revolved and pivoted during an opening and closing operation of said movable mold, said revolutionary and pivotal means including:
 (a) an operating rod including a root side portion received by said movable retainer plate,
 (b) a follower cylinder fixedly secured to a fixed member with respect to the movable retainer plate,
 (c) a piston formed on the operating rod and slidably inserted into said follower cylinder to allow movement of said operating rod, and
 (d) a revolutionary arm connected between said operating rod and said revolutionary block.

14. The mold device according to claim 13, wherein said operating rod is slidably supported in a mold opening and closing direction.

15. The mold device according to claim 14, wherein said piston is formed on an extreme end of said root side portion of said operating rod and allows movement of said rod in the mold opening and closing direction.

16. The mold device according to claim 14, wherein said revolutionary arm is linked with said operating rod so as to allow movement of said rod in the mold opening and closing direction and to maintain a horizontal position of the revolutionary block when said movable mold is opposite said fixed mold.

* * * * *